(12) United States Patent
Utsumi et al.

(10) Patent No.: US 11,273,482 B2
(45) Date of Patent: Mar. 15, 2022

(54) TRANSFER DEVICE

(71) Applicant: IHI LOGISTICS & MACHINERY CORPORATION, Tokyo (JP)

(72) Inventors: Yuuji Utsumi, Tokyo (JP); Yasushi Dodo, Tokyo (JP)

(73) Assignee: IHI LOGISTICS & MACHINERY CORPORATION, Tokyo (JP)

( * ) Notice: Subject to any disclaimer, the term of this patent is extended or adjusted under 35 U.S.C. 154(b) by 115 days.

(21) Appl. No.: 16/607,450

(22) PCT Filed: Apr. 24, 2018

(86) PCT No.: PCT/JP2018/016605
§ 371 (c)(1),
(2) Date: Oct. 23, 2019

(87) PCT Pub. No.: WO2018/199090
PCT Pub. Date: Nov. 1, 2018

(65) Prior Publication Data
US 2020/0139421 A1 May 7, 2020

(30) Foreign Application Priority Data
Apr. 26, 2017 (JP) .............................. JP2017-087598

(51) Int. Cl.
*B21D 43/02* (2006.01)
*B25J 11/00* (2006.01)

(52) U.S. Cl.
CPC ............... *B21D 43/02* (2013.01); *B25J 11/00* (2013.01)

(58) Field of Classification Search
CPC ........ B21D 43/02; B21D 43/04; B21D 43/05; B21D 43/052; B21D 43/055; B21D 43/057; B25J 9/106; B25J 9/1065
(Continued)

(56) References Cited

U.S. PATENT DOCUMENTS 6,715,981 B1 4/2004 Harsch et al.
2005/0166659 A1* 8/2005 Baba ..................... B21D 43/05
72/405.09
(Continued)

FOREIGN PATENT DOCUMENTS

CN 101189082 A 5/2008
CN 101454125 A 6/2009
(Continued)

OTHER PUBLICATIONS

International Search Report issued in Application No. PCT/JP2018/016605, dated Jul. 24, 2018, 4 pages.
(Continued)

*Primary Examiner* — Saul Rodriguez
*Assistant Examiner* — Brendan P Tighe
(74) *Attorney, Agent, or Firm* — Rothwell, Figg, Ernst & Manbeck, P.C.

(57) ABSTRACT

This transfer device is a transfer device which transfers an object to be transferred and includes a pivoting arm supported by a frame and configured to be rotatably driven around a pivot axis, a main arm which is rotatably connected to the pivoting arm and to which a support part which supports the object to be transferred is connected at a distal end portion, and an inclination adjustment part which is slidably connected to the main arm in a longitudinal direction of the main arm and has a parallel link mechanism to adjust an inclination of the main arm.

7 Claims, 7 Drawing Sheets

(58) Field of Classification Search
USPC .................................................. 414/752.1
See application file for complete search history.

(56) References Cited

U.S. PATENT DOCUMENTS

| | | | | |
|---|---|---|---|---|
| 2013/0309050 A1* | 11/2013 | Takeda | ................... | B21D 43/00 |
| | | | | 414/222.07 |
| 2015/0321347 A1 | 11/2015 | Hirota et al. | | |
| 2016/0184879 A1 | 6/2016 | Zulauf et al. | | |

FOREIGN PATENT DOCUMENTS

| | | | |
|---|---|---|---|
| CN | 101569910 A | | 11/2009 |
| CN | 101569911 A | | 11/2009 |
| CN | 102848377 A | | 1/2013 |
| CN | 103640894 A | | 3/2014 |
| CN | 104736264 A | | 6/2015 |
| CN | 105382118 A | | 3/2016 |
| CN | 105658350 A | | 6/2016 |
| JP | 58-009239 U | | 1/1983 |
| JP | 08-39463 A | | 2/1996 |
| JP | 2000-117367 A | | 4/2000 |
| JP | 2003-209155 A | | 7/2003 |
| JP | 2004-261819 A | | 9/2004 |
| JP | 2005-161406 A | | 6/2005 |
| JP | 2006-272353 A | | 10/2006 |
| JP | 2010-094695 A | | 4/2010 |
| JP | 3163939 U | | 11/2010 |
| JP | 2011-125881 A | | 6/2011 |
| JP | 2011125881 A | * | 6/2011 |
| JP | 2014-008579 A | | 1/2014 |
| WO | 2014/087879 A1 | | 6/2014 |
| WO | 2015/021564 A1 | | 2/2015 |

OTHER PUBLICATIONS

The CN Office Action for Appl. No. 201880017398.6 dated Nov. 27, 2020 (14 pages).
Office Action issued for Chinese Patent Application No. 201880017398.6 dated Apr. 8, 2020, (14 pages).

* cited by examiner

TRANSFER DEVICE

CROSS REFERENCE TO RELATED APPLICATION

This application is a 35 U.S.C. 371 National Phase Entry Application from PCT/JP2018/016605, filed Apr. 24, 2018, which claims priority to Japanese Patent Application No. 2017-087598, filed Apr. 26, 2017, the disclosures of which are incorporated herein in their entirety by reference, and priority is claimed to each of the foregoing.

TECHNICAL FIELD

The present relates to a transfer device.
Priority is claimed on Japanese Patent Application No. 2017-087598, filed Apr. 26, 2017, the content of which is incorporated herein by reference.

BACKGROUND ART

Conventionally, for example, a door panel or the like of a four-wheeled vehicle is manufactured by forming a steel plate in stages with a plurality of press devices. Patent Document 1 discloses a transfer device which is disposed between a plurality of press devices and transfers a workpiece such as a door panel formed using one press device to the next press device. In the transfer device of Patent Document 1, a posture of a main arm called a pivot arm at which a holding part that holds a workpiece is provided at a lower end portion is adjusted by moving a pivot shaft part provided at an intermediate portion of the main arm in a substantially horizontal direction.

CITATION LIST

Patent Document

Patent Document 1

PCT International Publication No. WO 2015/021564

SUMMARY OF INVENTION

Technical Problem

Incidentally, in a press device, it is necessary to place a workpiece between a and a punch which are vertically spaced apart. However, a separation distance between a die and a punch is often small, and thus it is difficult to place a workpiece at a processing position or to hold the workpiece at the processing position with a holding part unless a main arm is reclined to a posture close to horizontal. Although a mechanism that moves a pivot shaft part provided at an intermediate portion of the main arm in a substantially horizontal direction is provided in Patent Document 1, in order to recline the main arm to such an extent that the workpiece is accessible, a mechanism for moving the pivot shaft part in a substantially horizontal direction needs to be made extremely long in the transfer direction of the workpiece. In practice, since the mechanism interferes with the press device, it is difficult to make the mechanism sufficiently long. Therefore, in Patent Document 1, a configuration in which a distal end portion of the again arm is reclined to a posture close to horizontal by providing a joint in an intermediate portion of the main arm and bending the main arm with a servomotor is employed.

However, when a joint is provided in the intermediate portion of the main arm so that the main arm can be bent, the rigidity of the main arm may be reduced, which may lead to a decrease in the transfer speed of an object to be transferred and a deterioration in stability. Also, since it is necessary to move the main arm together with the servomotor for bending the main arm, more power is required to drive the main arm according to the weight of the servomotor for bending.

The present invention has been made in view of the above-described problems, and an objective of the present invention is to improve rigidity for the main arm by eliminating the need to bend the main arm, and furthermore, to improve a transferring speed and stability of an object to be transferred, and to reduce power for driving the main arm in a transfer device for transferring an object to be transferred from one press device to another press device.

Solution to Problem

The present invention employs the following configuration as means for solving the above-described problems.

A first aspect of the present invention provides a transfer device which transfers an object to be transferred including a pivoting arm supported by a frame and configured to be rotatably driven around a pivot axis, a main arm which is rotatably connected to the pivoting arm and to which a support part which supports the object to be transferred is connected at a distal end portion, and an inclination adjustment part which is slidably connected to the main arm in a longitudinal direction of the main arm and has a parallel link mechanism to adjust an inclination of the main arm.

A second aspect of the present invention provides the transfer device according to the first aspect, in which the parallel link mechanism may include a surrounding member which is able to slide and is attached on the main arm, a first link rod of which one end portion is rotatably connected to the surrounding member and the other end portion is lowered as it is moved toward a downstream side in a transfer direction of the object to be transferred, and a second link rod in which one end portion is rotatably connected to the surrounding member and the other end portion is raised as it is moved toward the downstream side in the transfer direction of the object to be transferred.

A third aspect of the present invention provides the transfer device according to the second aspect, in which the inclination adjustment part may include a first linear motion guide which guides the other end portion of the first link rod to be directed downward toward the downstream side in the transfer direction of the object to be transferred, a first linear motion motor which generates power to move the other end portion of the first link rod, a second linear motion guide which guides the other end portion of the second link rod to be directed upward toward the downstream side in the transfer direction of the object to be transferred, and a second linear motion motor which generates power to move the other end portion of the second link rod.

A fourth aspect of the present invention provides the transfer device according to the third aspect, in which the first linear motion guide, the second linear motion guide, the first linear motion motor, and the second linear motion motor may be fixed to the frame.

A fifth aspect of the present invention provides the transfer device according to the first aspect, in which the parallel link mechanism may lude a surrounding member which is able to slide and is attached on the main arm, a first link part having at least one joint part, of which one end portion is rotatably connected to the surrounding member and the other end portion is rotatably driven around a first rotating axis, and a second link part having at least one joint part, of which one end portion rotatably connected to the surrounding member and the other end portion is rotatably driven around a second rotating axis.

A sixth aspect of the present invention provides the transfer device according to the fifth aspect, in which the inclination adjustment part may include a first rotation motor which rotationally drives the other end portion of the first link part around the first rotating axis, and a second rotation motor which rotationally drives the other end portion of the second link part around the second rotating axis.

A seventh aspect of the present invention provides the transfer device according to the sixth aspect, in which the first rotation motor and the second rotation motor are fixed to the frame.

Effects of Invention

According to the present invention, an inclination of the main arm is adjusted using the parallel link mechanism which is made slidable in the longitudinal direction of the main arm. According to the present invention described above, since the inclination of the main arm can be adjusted by sliding the connection part of the parallel link mechanism with the main arm along the main arm, there is no need to provide an elongated mechanism in a substantially horizontal direction to adjust the inclination of the main arm. Therefore, since the main arm can be inclined close to a horizontal posture, there is no need to provide a joint in the middle of the main arm or to install a motor or the like for bending the main arm. Accordingly, for example, in a transfer device for transferring an object to be transferred from one press device to another press device, it is possible to improve the rigidity of the main arm by eliminating the need to bend the main arm, and furthermore, to improve a transferring speed and stability of the object to be transferred, and to reduce power for driving the main arm.

DESCRIPTION OF EMBODIMENTS

An embodiment of a transfer device according to the present invention will be described below with reference to the drawings.

First Embodiment

Figure 1A:
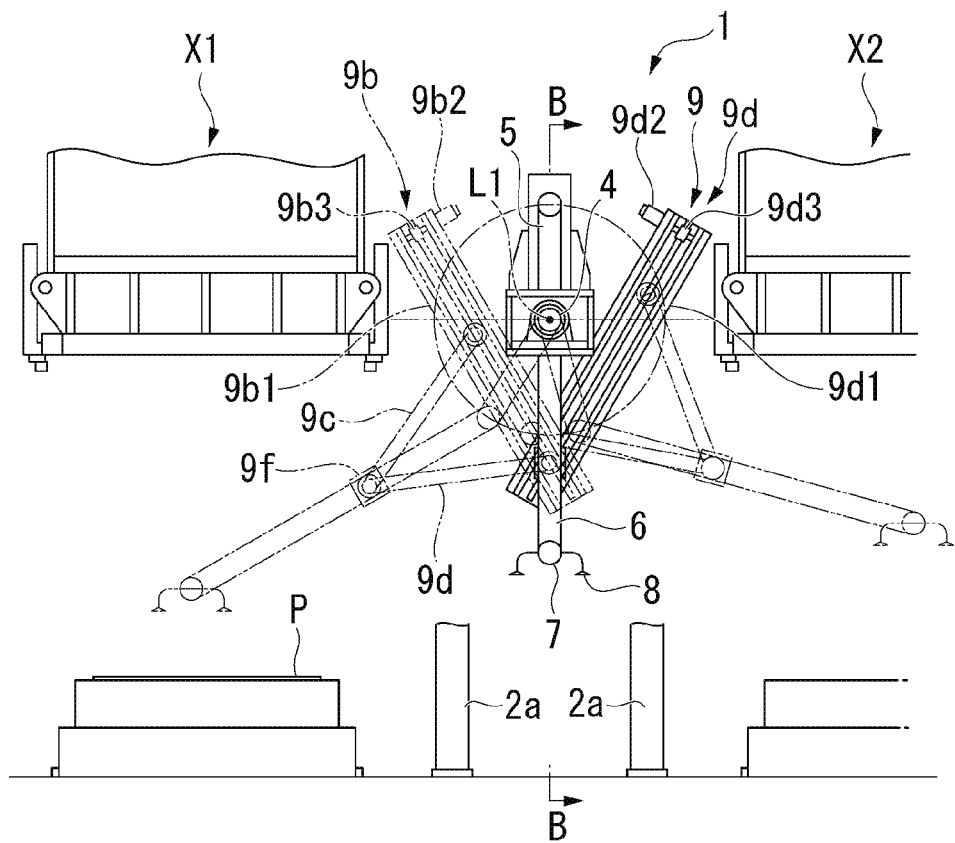
FIG. 1A is a side sectional view illustrating a schematic configuration of a transfer device of a first embodiment of the present invention.
Figure 1B:
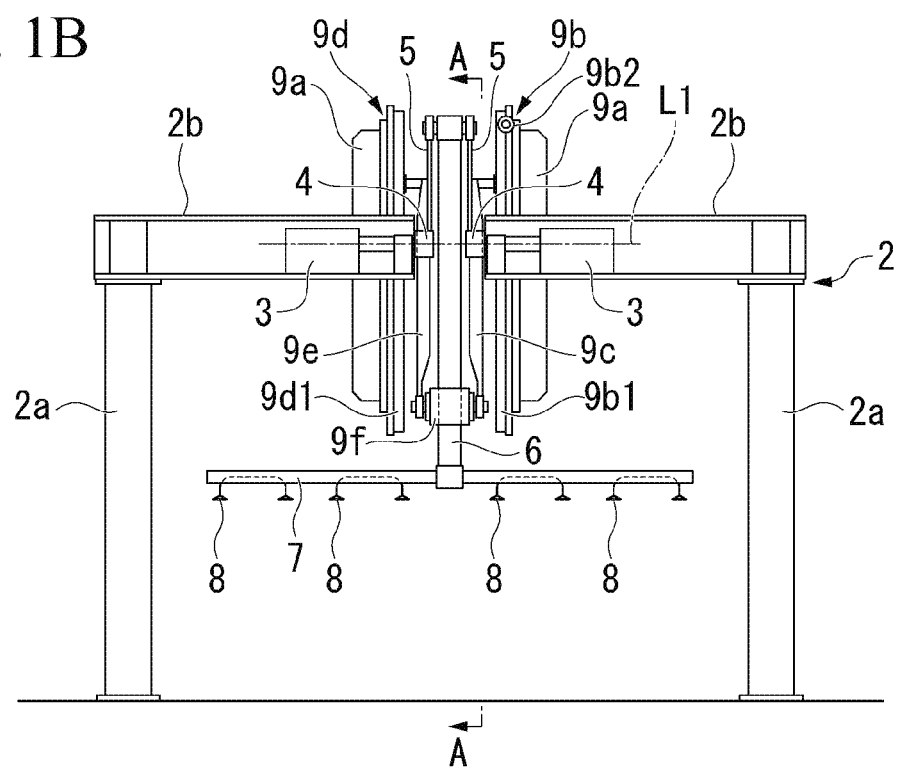
FIG. 1B is a front sectional view illustrating a schematic configuration of the transfer device of the first embodiment of the present invention.

FIG. 1A is a side sectional view illustrating a schematic figuration of a transfer device 1 of the present embodiment. FIG. 1B is a front sectional view illustrating a schematic configuration of the transfer device 1. Further, FIG. 1A is a cross-sectional view taken along line A-A of FIG. 1B and is a view from a direction along a pivot axis L1 to be described below. Also, FIG. 1B is a cross-sectional view taken along line B-B of FIG. 1A. The transfer device 1 of the present embodiment is disposed between a plurality of press devices (a press device X1 and a press device X2 in FIG. 1A) in which a door panel P (an object to be transferred) of a four-wheeled vehicle is subjected to press processing, and the door panel P that has been subjected to press processing by one press device X1 is transferred to the other press device X2. Further, although the object to be transferred of the transfer device 1 is the door panel P in the present embodiment, the object to be transferred in the present invention is not limited to the door panel P.

As illustrated in FIGS. 1A and 1B, the transfer device 1 of the present embodiment includes a frame 2, a pivot motor 3, a pivot shaft, part 4, a pivoting arm 5, a main arm 6, a cross bar 7, an adsorption part 8 and an inclination adjustment part 9.

The frame 2 is provided to stand upright on a floor part between the press device X1 and the press device X2, and directly or indirectly supports the pivot motor 3, the pivot shaft part 4, the pivoting 5, the main arm 6, the cross bar 7, the adsorption part 8, and the inclination adjustment part 9. The frame 2 is a strengthening member of the transfer device 1 of the present embodiment that does not move or deform even when the lain arm 6 moves. Further, the frame 2 in the transfer device 1 of the present embodiment is provided separately from the press device X1 and the press device X2. However, it is also possible to employ a configuration in which the frame 2 is integrated with the press device X1 or the press device X2, or a configuration in which a frame of the press device X1 or the press device X2 is used as the frame.

As illustrated in FIG. 1B, the frame 2 in the transfer device 1 of the present embodiment includes a plurality of column parts 2a provided, to stand upright with a transfer region of the door panel P sandwiched therebetween, and a beam part 2b extending in a horizontal direction from the column parts 2a above the transfer region of the door panel P. In other words, a side on which the beam part 2b is provided in the transfer region of the door panel P is referred to as an upper side, and a side opposite thereto is referred to as a lower side. The beam part 2b is formed in an elongated box shape having a hollow inside and a pair of beam parts 2b are provided to sandwich the main arm 6. The pair of beam parts 2b are disposed to overlap each other when viewed from the horizontal direction perpendicular to a transfer direction of the door panel P (lateral direction as viewed in FIG. 1A). Further, the transfer direction of the door panel P in the present embodiment is a direction from the press device X1 toward the press device X2.

The pivot motor 3 is a servomotor that generates power for pivotally driving the pivoting arm 5 and generates power under control of a control device (not illustrated). The pivot motor 3 is provided to each of the pair of beam parts 2b. That is, in the transfer device 1 of the present embodiment, two pivot motors 3 are installed. These pivot motors 3 are synchronously controlled the control device illustrated).

The pivot shaft part 4 is a shaft member connecting the pivot motor 3 and the pivoting arm 5 and is rotated by rotational power transmitted from the pivot motor 3. The pivot shaft part 4 is provided to each of output shafts of the two pivot motors 3. That is, in the transfer device 1 of the present embodiment, two pivot shaft parts 4 are provided. As illustrated in FIG. 1B, these pivot shaft parts 4 are disposed at positions on the main arm 6 side with respect to the end portions of the beam parts 2b. Also, these pivot shaft parts 4 are pivoted around the single pivot axis L1 in the horizontal direction perpendicular to the transfer direction of the door panel P. Further, a device such as a speed reducer may be installed as necessary between the pivot motors 3 and the pivot shaft parts 4.

The pivoting arm 5 is an arm member of which one end portion is fixed to the pivot shaft part 4 and the other end portion is rotatably connected to an upper end portion (one end portion, an end portion close to the pivot axis L1) of the main arm 6. The pivoting arm 5 is provided to each of the two pivot shaft parts 4. That is, in the transfer device 1 of the present embodiment, two pivoting arms 5 are provided. The two pivoting arms 5 are disposed with the main arm 6 sandwiched therebetween. These pivoting arms 5 are set to have the same length dimension and are respectively fixed to the pivot shaft parts 4 in an overlapping posture when viewed from the horizontal direction perpendicular to the transfer direction of the door panel P. These pivoting arms 5 are rotated around the pivot axis L1 when the pivot shaft parts 4 are rotated. That is, these pivoting arms 5 are rotatably driven n synchronization around the pivot axis L1 by the pivot motors 3. Further, the other end portion of each of the pivoting arms 5 is connected to the main arm 6 to be rotatable in a rotation direction around a rotating axis in the horizontal direction perpendicular to the transfer direction of the door panel P. That is, the upper end portion of the main arm 6 is pivotally supported by the other end portion of the pivoting arm 5.

Also, since the other end portion of the pivoting arm 5 is connected to the upper end portion of the main arm 6, a position of the other end portion of the pivoting arm 5 is a position of the upper end portion of the main arm 6. In the transfer device 1 of the present embodiment, when the other end portion of the pivoting arm 5 is positioned directly below the pivot shaft part 4 as described below, the main arm 6 is in a most reclined posture with respect to a horizontal plane (a posture in which an angle between a longitudinal direction of the main arm 6 and the horizontal plane is minimized). Therefore, a length dimension of the pivoting arm 5 defines an upper end position of the main arm 6 in a most reclined state, and an inclination angle of the main arm 6 in the most reclined state is set to be an angle at which the door panel P can be taken in and out with respect to the press device X1 and the press device X2. For example, the length dimension of the pivoting arm 5 in the transfer device 1 of the present embodiment may be set such that, when a distal end portion thereof is at a lowermost position, the distal end portion is at the same position as a doorway (between a die and a punch spaced apart in a height direction) of the press devices (the press device X1 and the press device X2) in the height direction.

The main arm 6 is rotatably connected at its upper end portion to the other end portion of the pivoting arm 5 as described above and is connected at its lower end portion (the other end portion, an end portion on a side opposite to the end portion close to the pivot axis L1), which is a distal end portion, to a support part (the cross bar 7, the adsorption part 8, or the like) for supporting the door panel P. The main arm 6 is an elongated member linearly extending from the upper end portion to the lower end portion and has substantially a rectangular cross-sectional shape perpendicular to the longitudinal direction. Further, a shape other than a rectangle may be employed for the above-described cross-sectional shape of the main arm 6. Also, a length dimension (a dimension in the longitudinal direction) of the main arm 6 is set such that the lower end portion is positioned below the inclination adjustment part 9 when the other end portion of the pivoting arm 5 is positioned at an uppermost portion. Also, a circumferential surface of the main arm 6 is a sliding surface on which a sliding block 9f (to be described below) of the inclination adjustment part 9 slides. Such a main arm 6 is movable by power transmitted from the pivot motor 3 via the pivot shaft part 4 and the pivoting arm 5, and furthermore, a posture thereof during movement is changed by the inclination adjustment part 9.

The cross bar 7 is an elongated member linearly extending in the horizontal direction perpendicular to the transfer direction of the door panel P and is connected to be perpendicular to the main arm 6 when viewed from the transfer direction of the door panel P as illustrated in FIG. 1B. The cross bar 7 is connected at its central portion in a longitudinal direction to the lower end portion of the main arm 6 and is pivotally supported by the lower end portion of the main arm 6 to be rotatable around the rotating axis in the horizontal direction perpendicular to the transfer direction of the door panel P.

The adsorption part 8 is a portion that supports the door panel P by adsorbing an upper surface of the door panel P, and a plurality of adsorption parts 8 are arranged in the longitudinal direction of the cross bar 7 to be vertically suspended downward from the cross bar 7. The adsorption parts 8 adsorb and support the door panel P using a negative pressure formed by a vacuum generation device (pump, injector, or the like) (not illustrated) under control of the control device.

A tilt adjustment mechanism (not illustrated) for adjusting a rotation angle of the cross bar 7 is accommodated in a connection portion between the main arm 6 and the cross bar 7. The tilt adjustment mechanism includes a servomotor or the like and adjusts a rotational posture of the cross bar 7 so that a posture of the door panel P supported by the adsorption parts 8 is stabilized. In the transfer device 1 of the present embodiment, the support part of the present invention is constituted by the cross bar 7, the adsorption parts 8, the tilt adjustment mechanism (not illustrated), and the like, described above. However, it is also possible to constitute the support part of the present invention without providing the tilt adjustment mechanism.

The inclination adjustment part 9 is a mechanism that adjusts a posture of the main arm 6 moved by the power of the pivot motor 3 and includes a base part 9a (not illustrated in FIG. 1A), a first linear motion mechanism 9b, a swing arm 9c (a first link rod a second linear motion mechanism 9d, a support arm 9e (a second link rod), and the sliding block 9f. The base part 9a is fixed to the beam part 2b of the frame 2 and is a strengthening member for supporting the first linear motion mechanism 9b and the second linear motion mechanisms 9d. As illustrated in FIG. 1B, in the transfer device 1 of the present embodiment, a total of two base parts 9a including a base part 9a supporting first linear motion mechanism 9b and a base part 9a supporting the second linear motion mechanism 9d are provided. The first linear motion mechanism 9b is disposed on one side of the main arm 6 (right side as viewed in FIG. 1B) in a direction along the pivot axis L1, and the second linear motion mechanism 9d is disposed on the other side of the main arm 6 (left side as viewed in FIG. 1B) in the direction along the pivot axis L1. That s linear motion mechanism 9b and the second linear motion mechanism 9d are disposed with the main arm 6 sandwiched therebetween.

The first linear motion mechanism 9b is a unit for linearly moving an upper end portion (the other end portion) of the swing arm 9c, and includes a first linear motion guide 9b1, a first linear motion motor 9b2, and a first ball screw 9b3. As illustrated in FIG. 1A, the first linear motion guide 9b1 is a guide disposed to be inclined such that an upper end portion is positioned upstream of a lower end portion in the transfer direction of the door panel P, and linearly guides the upper end portion of the swing arm 9c to be directed downward toward a downstream side in the transfer direction of the door panel P. That is, the first linear motion guide 9b1 is inclined downward toward the downstream side in the transfer direction of the door panel P. The first linear motion motor 9b2 is a servomotor that generates power for moving the upper end portion of the swing arm 9c and is fixed to the first linear motion guide 9b1. The first linear motion motor 9b2 generates power under control of the control device (not illustrated). The first ball screw 9b3 transmits the power generated by the first linear motion 9b2 to the upper end portion of the swing arm 9c to linearly move the upper end portion of the siring arm 9c along the first linear motion guide 9b1. The first linear motion guide 9b1 and the first linear motion motor 9b2 are fixed to the frame 2.

The swing arm 9c is a link rod of which the upper end portion is slidably attached to the first linear motion guide 9b1 of the first linear motion mechanism 9b, and a lower end portion (one end portion) is rotatably connected to an outer circumferential surface of the sliding block 9f. The lower end portion of the swing arm 9c is connected to the sliding block 9f to be rotatable around the rotating axis in the horizontal direction perpendicular to the transfer direction of the door panel P.

The second linear motion mechanism 9d is a unit for linearly moving an upper end portion (the other end portion) of the support arm 9e and includes a second linear motion guide 9d1, a second linear motion motor 9d2, and a second ball screw 9d3. As illustrated in FIG. 1A, the second linear motion guide 9d1 is a guide disposed to be inclined such that an upper end portion is positioned downstream of a lower end portion in the transfer direction of the door panel P, and linearly guides the upper end portion of the support arm 9e to be directed upward toward the downstream side in the transfer direction of the door panel P. That is, the second linear motion guide 9d1 is inclined upward toward the downstream side in the transfer direction of the door panel P. The second linear motion motor 9d2 is a servomotor that generates power for moving the upper end portion of the support arm 9e and is fixed to the second linear motion guide 9d1. The second linear motion motor 9d2 generates power under control of the control device (not illustrated). The second ball screw 9d3 transmits the power generated by the second linear motion motor 9d2 to the upper end portion of the support arm 9e to linearly move the upper end portion of the support arm 9e along the second linear motion guide 9d1. The second linear motion guide 9d1 and the second linear motion motor 9d2 are fixed to the frame 2.

The support arm 9e is a link rod of which the upper end portion is slidably attached to the second linear motion guide 9d1 of the second linear motion mechanism 9d, and a lower end portion (one end portion) is rotatably connected to the outer circumferential surface of the sliding block 9f. The lower end portion of the support arm 9e is connected to the sliding block 9f to be rotatable around the rotating axis in the horizontal direction perpendicular to the transfer direction of the door panel P. Further, the rotating axis of the lower end portion of the support arm 9e and the rotating axis of the lower end portion of the swing arm 9c are disposed to overlap each other when viewed in the horizontal direction perpendicular to the transfer direction of the door panel P.

The sliding block 9f is a surrounding member having an opening through the main arm 6 is inserted at a central portion when viewed from a direction along the longitudinal direction of the main arm 6 and is slidably attached on the main arm 6. An inner circumferential surface of the sliding block 9f is slidable with respect to the outer circumferential surface of the main arm 6. The sliding block 9f described above moves along the main area 6 due to movement of the swing arm 9c and the support arm 9e to change a position supporting the main arm 6, thereby changing a posture of the main arm 6.

The inclination adjustment part 9 described above includes a sliding block 9f which is slidably connected to the main arm 6 and has a parallel link structure of which two link rods (the swing arm 9c and the support arm 9e) are connected to the sliding block 9f. That is, the inclination adjustment part 9 in the transfer device 1 of the present embodiment is slidably connected to the main arm 6 in the longitudinal direction of the main arm 6 and has a parallel link mechanism to adjust an inclination of the main arm 6.

Next, an operation of the transfer device 1 of the present embodiment will be described with reference to FIGS. 2 to 4. Further, in FIGS. 2 to 4, respective constituent elements are schematically illustrated, the frame 2 and the pivot motor 3 are omitted, and the first linear motion motor 9b2, the first ball screw 9b3, the second linear motion motor 9d2, and the second ball screw 9d3 of the inclination adjustment part 9 are also omitted.

In the following description, an operation until the door panel P formed by the press device X1 (left side in FIGS. 2 to 4) is transferred to the press device X2 (right side in FIGS. 2 to 4) will be described. A main agent of this operation is the control device (not illustrated). Also, each drawing illustrated in FIGS. 2 to 4 illustrates a moment in the process of continuously transferring the door panel P from the press device X1 to the press device X2 and does not mean that the transfer of the door panel P is temporarily stopped in the state illustrated in each drawing of FIGS. 2 to 4.

First, when the pivot motor 3 is driven, a pivot angle of the pivoting arm 5 is set so that the distal end portion is positioned slightly on the press device side (left side in FIG. 2(a)) from the lowermost position as illustrated in FIG. 2(a). At the same time, the upper end portion of the swing arm 9c is disposed at a center portion of the first linear motion guide 9b1 by driving the linear motion motor 9b2, and the upper end portion of the support arm 9e is disposed in the vicinity of a lower end of the second linear motion guide 9d1 by driving the second linear motion motor 9d2. Thereby, the cross bar 7 is disposed at a position on a side closest to the press device X1 and lowered, and the adsorption part 8 comes into contact with the door panel P. Here, the door panel P is adsorbed and supported by the adsorption part 8 from an upper surface side. Thereby, movement of the door panel P is possible.

Further, when the pivot motor 3 continues to be driven, the pivoting arm 5 is pivoted so that the distal end portion approaches the lowermost position as illustrated in FIG. 2(b). At the same time, the upper end portion of the swing arm 9c is brought closer to an upper end of the first linear motion guide 9b1 by driving the first linear motion motor 9b2, and the upper end portion of the support arm 9e is brought closer to an upper end of the second linear motion guide 9d1 by driving the second linear motion motor 9d2. Thereby, the cross bar 7 is raised from the state of FIG. 2(a). Therefore, the door panel P adsorbed by the adsorption part 8 is lifted.

Further, when the pivot motor 3 continues to be driven, the pivoting arm 5 is pivoted so that the distal end portion passes the lowermost position and is positioned on the press device X2 side (right side in FIG. 2(c)) as illustrated in FIG. 2(c). At the same time, the upper end portion of the swing arm 9c is brought even closer to the upper end of the first linear motion guide 9b1 by driving the first linear motion motor 9b2, and the upper end portion of the support arm 9e is brought even closer to the upper end of the second linear motion guide 9d1 by driving the second linear motion motor 9d2. Thereby, the main arm 6 is pulled to the press device X2 side and is raised by being slidably supported by the sliding block 9f, and the cross bar 7 is substantially horizontally moved to the press device X2 side. Therefore, the door panel P adsorbed by the adsorption part 8 is substantially horizontally moved toward the press device X2.

Further, when the pivot motor 3 continues to be driven, the pivoting arm 5 is pivoted so that the distal end portion is positioned on the press device X2 side (right side in FIG. 3(a)) and higher than the pivot shaft part 4 in the height direction as illustrated in FIG. 3(a). At the same time, the upper end portion of the swing arm 9e is brought even closer to the upper end of the first linear motion guide 9b1 by driving the first linear motion motor 9b2, and the upper end portion of the support arm 9e is brought even closer to the upper end of the second linear motion guide 9d1 by driving the second linear motion motor 9d2. Thereby, the main arm 6 is further pulled to the press device X2 side and is raised by being slidably supported by the sliding block 9f, and the cross bar 7 is substantially horizontally moved to the press device X2 side. Therefore, the door panel P adsorbed by the adsorption part 8 is moved substantially horizontally further toward the press device X2.

Further, when the pivot motor 3 continues to be driven, the pivoting arm 5 is pivoted so that the distal end portion is at an uppermost position as illustrated in FIG. 3(b). At the same time, the upper end portion of the swing arm 9c is brought closer to the lower end of the first linear motion guide 9b1 by driving the first linear motion motor 9b2, and the upper end portion of the support arm 9e is brought even closer to the upper end of the second linear motion guide 9d1 by driving the second linear motion motor 9d2 so that height positions of the upper end portion of the swing arm 9c and the upper end portion of the support arm 9e are made the same. Thereby, the main arm 6 is in a vertical posture (a posture of which a longitudinal direction and a vertical direction of the main arm 6 are parallel to each other), and the cross bar 7 is positioned between the press device X1 and the press device X2. Therefore, the door panel P adsorbed by the adsorption part 8 is disposed between the press device X1 and the press device X2.

Further, when the pivot motor 3 continues to be driven, the pivoting arm 5 is pivoted so that the distal end portion is positioned on the press device X1 side (left side in FIG. 3(c)) and higher than the pivot shaft part 4 in the height direction as illustrated in FIG. 3(c). At the same time, the upper end portion of the swing arm 9c is brought closer to a lower end of the first linear motion guide 9b1 by driving the first linear motion motor 9b2, and the upper end portion of the support arm 9e is brought closer to the upper end of the second linear motion guide 9d1 by driving the second linear motion motor 9d2. Thereby, the upper end portion of the main arm 6 is pulled further to the press device X1 side, the main arm 6 is reclined with respect to the horizontal surface by being slidably supported by the sliding block 9f, and the cross bar 7 is proved substantially horizontally to the press device X2 side. Therefore, the door panel P adsorbed by the adsorption part 8 is moved substantially horizontally further toward the press device X2.

Further, when the pivot motor 3 continues to be driven, the pivoting arm 5 is pivoted so that the distal end portion is positioned on the press device X1 side with respect to the lowermost position and lower than the pivot shaft part 4 in the height direction as illustrated in FIG. 4(a). At the same time, the upper end portion of the swing arm 9c is brought even closer to the lower end of the first linear motion guide 9b1 by driving the first linear motion motor 9b2, and the upper end portion of the support arm 9e is brought closer to the lower end of the second linear motion guide 9d1 by driving the second linear motion motor 9d2. Thereby, the main arm 6 is pushed to the press device X2 side and is further reclined by being slidably supported by the sliding block 9f, and the cross bar 7 is moved substantially horizontally further to the press device X2 side. Therefore, the door panel P adsorbed by the adsorption part 8 is moved substantially horizontally further toward the press device X2.

Further, when the pivot motor 3 continues to be driven, the pivot arm 5 is pivoted so that the distal end portion is disposed slightly on the press device X2 side (right side in FIG. 4(b)) from the lowermost position as illustrated in FIG. 4(b). At the same time, the upper end portion of the swing arm 9c is brought even closer to the lower end of the first linear motion guide 9b1 by driving the first linear motion motor 9b2, and the upper end portion of the support arm 9e is brought even closer to the lower end of the second linear motion guide 9d1 by driving the second linear motion motor 9d2. Thereby, the cross bar 7 is disposed above a placing position of the door panel P in the press device X2. Therefore, the door panel P adsorbed by the adsorption part 8 is also disposed above the placing position of the door panel P in the press device X2.

Further, when the pivot motor 3 continues to be driven, the pivoting arm 5 is pivoted so that the distal end portion is positioned further on the press device X2 side (right side in FIG. 4(c) from the lowermost position as illustrated in FIG. 4(c). At the same time, the upper end portion of the swing arm 9c is brought even closer to the lower end of the first linear motion guide 9b1 by driving the first linear motion motor 9b2, and the upper end portion of the support arm 9e is brought even closer to the lower end of the second linear motion guide 9d1 by driving the second linear motion motor 9d2. Thereby, the cross bar 7 is disposed at a position on a side closest to the press device X2 and lowered with respect to the position illustrated in FIG. 4(b), and the door panel P adsorbed by the adsorption part 8 is placed on the press device X2. Thereafter, the adsorption operation of the adsorption part 8 is stopped and the door panel P is separated from the adsorption part 8, thereby completing the transfer of the door panel P from the press device X1 to the press device X2.

Figure 2:
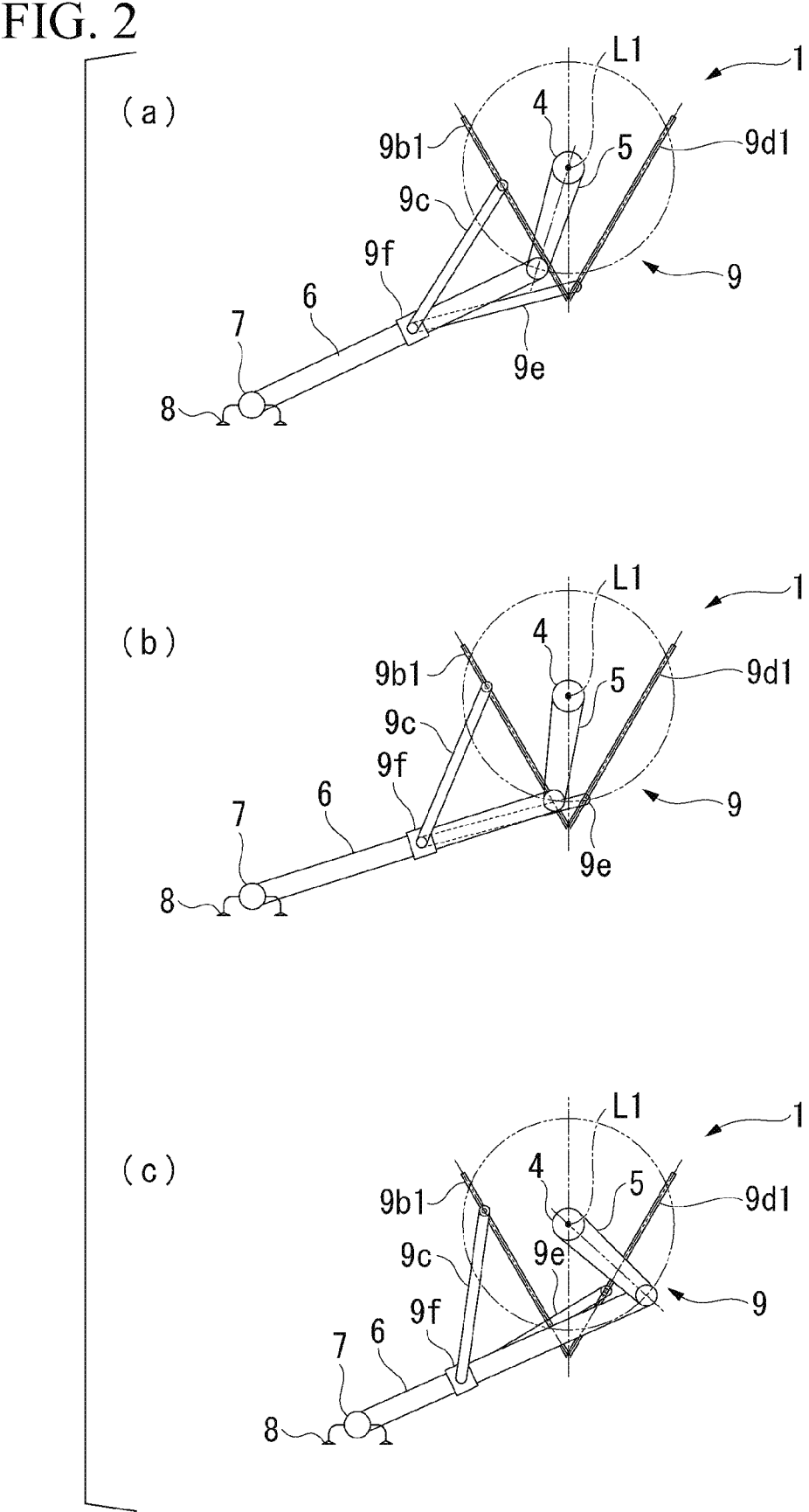
FIG. 2 is a schematic view of the transfer device of the first embodiment of the present invention, and an explanatory view for explaining an operation thereof.
Figure 3:
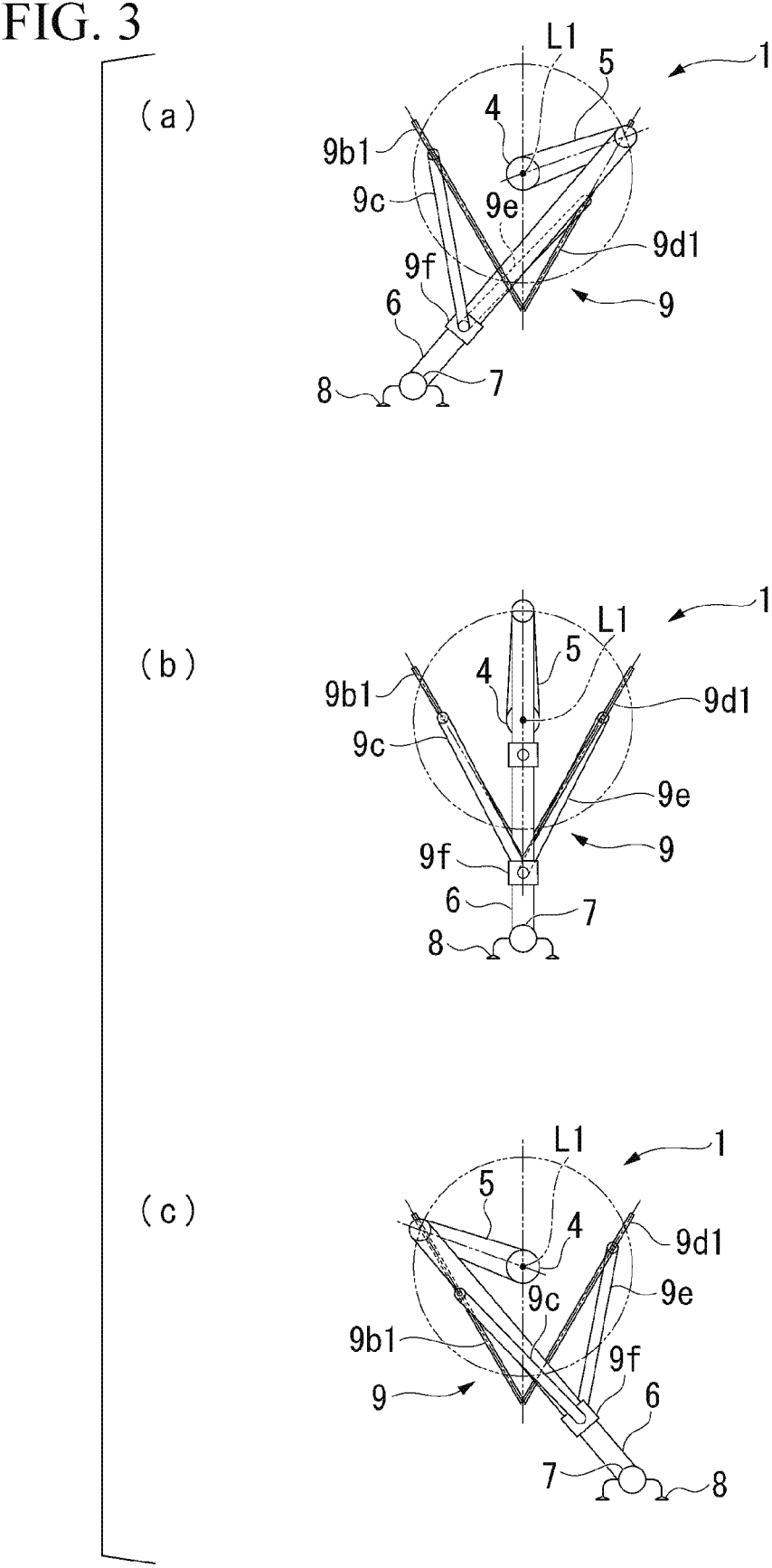
FIG. 3 is a schematic view of the transfer device of the first embodiment of the present invention, and an explanatory view for explaining the operation.
Figure 4:
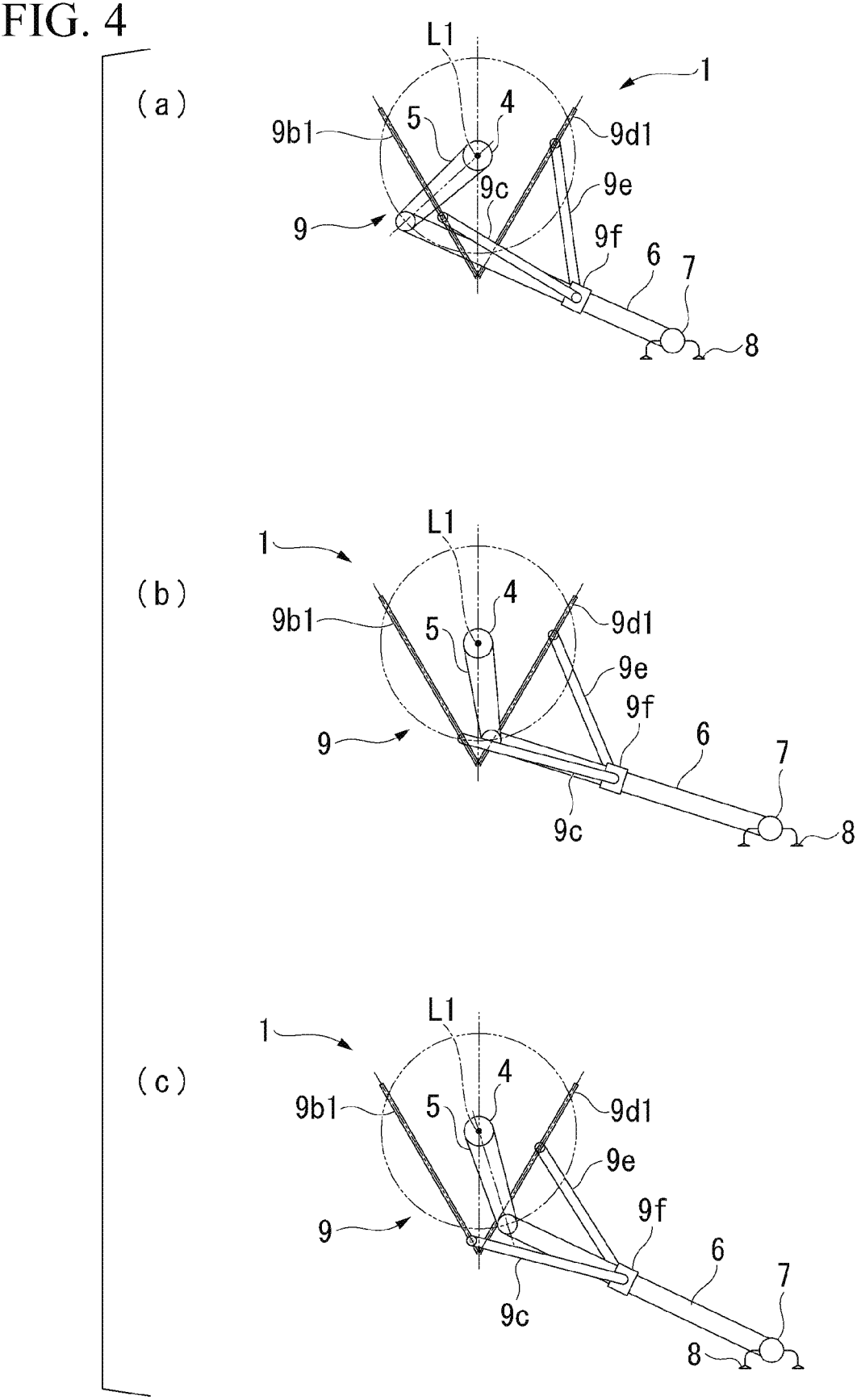
FIG. 4 is a schematic view of the transfer device of the first embodiment of the present invention, and an explanatory view for explaining the operation.

Further, when the cross bar 7 is returned from the press device X2 to the press device X1, an operation opposite to the above-described operation described with reference to FIG. 2 to 4 is performed. Thereby, the cross bar 7 is continuously moved substantially horizontally from the press device X2 to the press device X1.

Also, the pivot angle of the pivoting arm 5, the position of the upper end portion of the swing arm 9c, and the position of the upper end portion of the support arm 9e in the above description of the operation are merely an example in a case in which the respective members have the dimensions and shapes illustrated in FIGS. 1A and 1B. The dimensions and shapes of the respective members are not particularly limited. Therefore, when the dimensions and shapes of the respective members are changed, the pivot angle of the pivoting arm 5, the position of the upper end portion of the swing arm 9c, and the upper end portion of the support arm 9e may also be changed according to the changed dimensions and shapes. In practice, the pivot angle of the pivoting arm 5, the position of the upper end portion of the swing arm 9c, and the position of the upper end portion of the support arm 9e are set so that the distal end position of the main arm 6 (that is, the position of the cross bar 7) is at a desired position.

In the transfer device 1 of the present embodiment described above, the inclination of the main arm 6 is adjusted using the parallel link mechanism which is made slidable in the longitudinal direction of the main arm 6. According to the transfer device 1 of the present embodiment described above, since the inclination of the main arm 6 can be adjusted by sliding the sliding block 9f, which is a connection part of the parallel link mechanism with the main arm 6, along the main arm 6, there is no need to provide an elongated mechanism in a substantially horizontal direction to adjust the inclination of the main arm 6. Therefore, since the main arm 6 can be inclined close to a horizontal posture (a posture in which the longitudinal direction of the main arm 6 and the horizontal plane are parallel to each other), there is no need to provide a joint in the middle of the main arm 6 or to install a motor for bending the main arm 6. Accordingly, since the need to bend the main arm 6 is eliminated, the rigidity of the main arm 6 can be enhanced, and furthermore, a transfer speed and stability of the door panel P can be enhanced, and power for driving the main arm 6 can be reduced.

Also, in the transfer device 1 of the present embodiment, the parallel link mechanism includes the sliding block 9f which is slidably attached on the main arm 6, the swing arm 9c, one end portion of which is rotatably connected to the sliding block 9f and the other end portion of which is lowered as it is moved toward the downstream side in the transfer direction of the door panel P, and the support arm 9e, one end portion of which is rotatably connected to the sliding block 9f and the other end portion of which is raised as it is moved toward the downstream side in the transfer direction of the door panel P. According to the transfer device 1 of the present embodiment described above, the structure of the parallel link mechanism can be simplified, and weight reduction of the movable parts of the transfer device 1 can be achieved.

Also, in the transfer device 1 of the present embodiment, the inclination adjustment part 9 includes the first linear motion guide 9b1 which guides the other end portion of the swing arm 9c to be directed downward toward the downstream side in the transfer direction of the door panel P, the first linear motion motor 9b2 which generates power to move the other end portion of the swing arm 9c, the second linear motion guide 9d1 which guides the other end portion of the support arm 9e to be directed upward toward the downstream side in the transfer direction of the door panel P, and the second linear motion motor 9d2 which generates power to move the other end portion of the support arm 9e. In the transfer device 1 of the present embodiment described above, as illustrated in FIG. 1A, the first linear motion motor 9b2 can be fixed to the first linear motion guide 9b1, and the second linear motion motor 9d2 can be fixed to the second linear motion guide 9d1. Therefore, at the time of the operation of the transfer device 1, the first linear motion motor 9b2 and the second linear motion motor 9d2 are not moved, and thus power for driving the transfer device 1 can be reduced.

Second Embodiment

Next, a second embodiment of the present invention will be described with reference to FIGS. 5 to 7. In the present embodiment, description will be omitted or simplified for portions the same as those in the first embodiment.

Figure 5:
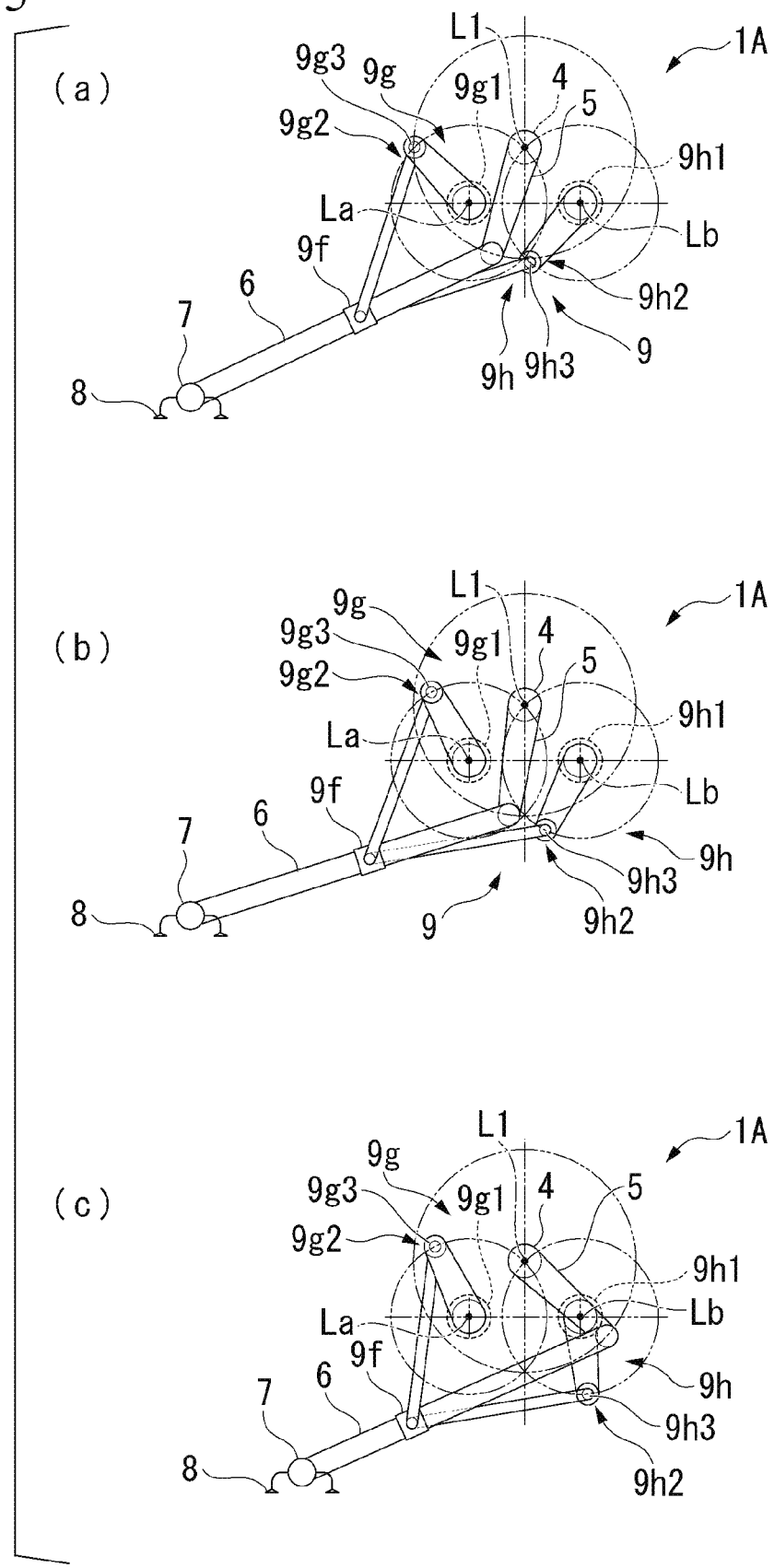
FIG. 5 is a schematic view of the transfer device of the second embodiment of the present invention, and an explanatory view for explaining an operation thereof.
Figure 6:
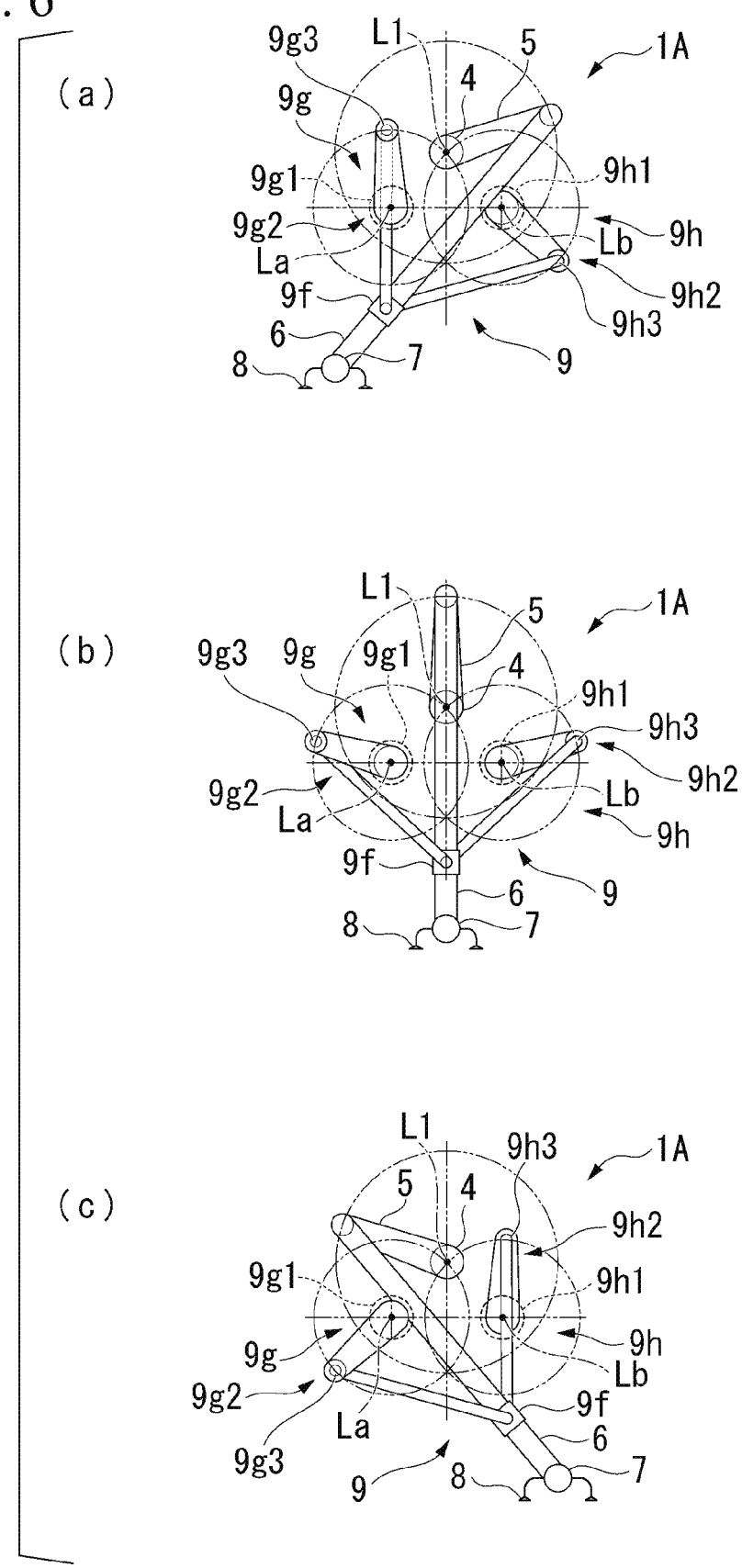
FIG. 6 is a schematic view of the transfer device of the second embodiment of the present invention, and an explanatory view for explaining the operation.
Figure 7:
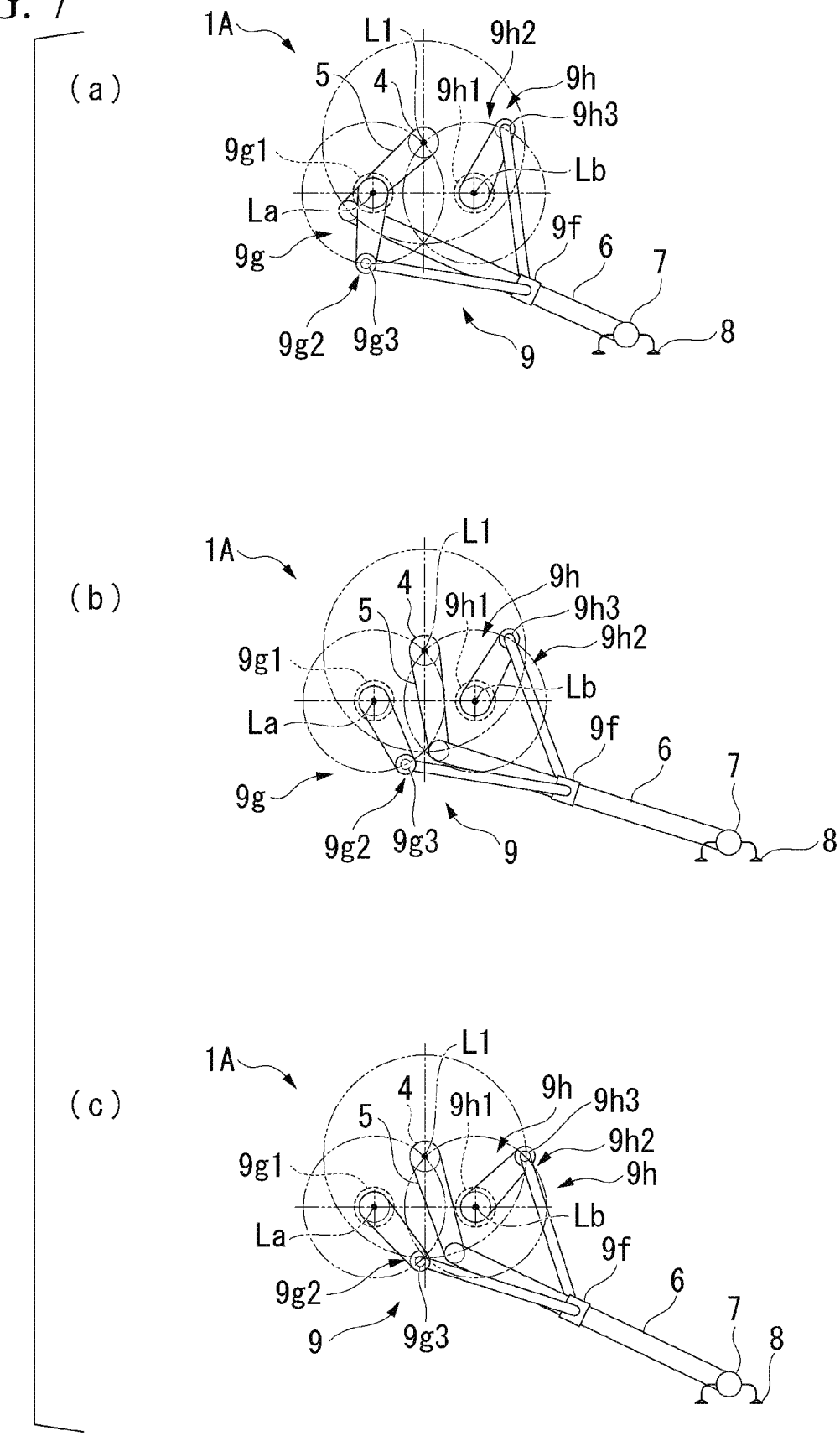
FIG. 7 is a schematic view of the transfer device of the second embodiment of the present invention, and an explanatory view for explaining the operation.

FIGS. 5 to 7 are schematic views for explaining an operation of a transfer device 1A of the present embodiment. In FIGS. 5 to 7, the frame 2 and the pivot motor 3 described above are omitted as in FIGS. 2 to 4.

As illustrated in these figures, the transfer device 1A of the present embodiment includes a first rotation mechanism 9g instead of the first linear motion mechanism 9b and the swing arm 9c of the inclination adjustment part 9 included in the transfer device 1 of the first embodiment described above, and a second rotation mechanism 9h instead of the second linear motion mechanism 9d and the support arm 9e of the inclination adjustment part 9 included in the transfer device 1 of the first embodiment described above. Also, in addition to the first rotation mechanism 9g and the second rotation mechanism 9h, an inclination adjustment part 9 in the transfer device 1A of the present embodiment includes a sliding block 9f that is included in the transfer device 1 of the first embodiment described above.

The first rotation mechanism 9g includes a first rotation motor 9g1 and a first link part 9g2. The first rotation motor 9g1 is fixed to one of the beam parts 2b (see FIG. 1B) of the frame 2 directly or directly via the base part 9a (see FIG. 1B). That is, the first rotation motor 9g1 is fixed to the frame 2. The first rotation motor 9g1 is connected to an end portion of the first link part 9g2 and generates power to be transmitted to the first link part 9g2.

The first link part 9g2 is a link member having one (single) joint part 9g3 at an intermediate portion, of which a first end portion (one end portion), which is an end portion on one side, is connected to the sliding block 9f to be rotatable around a rotating axis in a horizontal direction perpendicular to a transfer direction of a door panel P, and a second end portion (the other end portion), which is an end portion on the other side, is connected to the first rotation motor 9g1. By the first rotation motor 9g1, the above-described second end portion of the first link part 9g2 is rotatably driven around a rotating axis La (a first rotating axis) the horizontal direction perpendicular to the transfer direction of the door panel P. The first link part 9g2 includes a base side link rod whose one end portion is fixed to the first rotation motor 9g1, and a distal end side link rod which is rotatably connected to the base side link rod at the joint part 9g3 and whose one end portion is connected to the sliding block 9f, in which a length dimension of the base side link rod is set be smaller than a length dimension of the distal end side link rod.

The first link part 9g2 described above is rotatably driven around the rotating axis La passing through the second end portion by receiving the power from the first rotation motor 9g1. That is, the above-described base side link rod of the first link part 9g2 is rotatably driven around the rotating axis La passing through the second end portion by receiving the power from the first rotation motor 9g1. Also, when the power generated by the first rotation motor 9g1 is transmitted, the joint part 9g3 is bent in a driven manner and thereby the first link part 9g2 is deformed into a bent state. When the power generated by the first rotation motor 9g1 is transmitted, the joint part 9g3 is rotationally moved around the rotating axis La with a radius dimension substantially the same as a length dimension of the base side link rod.

The second rotation mechanism 9h includes a second rotation motor 9h1 and a second link part 9h2. The second rotation motor 9h1 is fixed to the other of the beam parts 2b (see FIG. 1B) of the frame 2 directly or indirectly via the base part 9a (see FIG. 1B). That is, the second rotation motor 9h1 is fixed to the frame 2. The second rotation motor 9h1 is connected to an end portion of the second link part 9h2 and generates power to be transmitted to the second link part 9h2.

The second link part 9h2 is a link member having one (single) joint part 9h3 at an intermediate portion, in which a first end portion (one end portion), which is an end portion on one side, is connected to the sliding block 9f to be rotatable around the rotating axis in the horizontal direction perpendicular to the transfer direction of the door panel P, and a second end portion (the other end portion), which is an end portion on the other side, is connected to the second rotation motor 9h1. By the second rotation motor 9h1, the above-described second end portion of the second link part 9h2 is rotatably driven around a rotating axis Lb (a second rotating axis) in the horizontal direction perpendicular to the transfer direction of the door panel P. The second link part 9h2 includes a base side link rob whose one end portion is fixed to the second rotation motor 9h1, and a distal end side link rod which is rotatably connected to the base side link rod at the joint part 9h3 and whose one end portion is connected to the sliding block 9f, of which a length dimension of the base side link rod is set to be smaller than a length dimension of the distal end side link rod. Further, in the first link part 9g2 and the second link part 9h2, lengths of the base side link rods are set to be the same, and lengths of the distal end side link rods are also set to be the same. Also the rotating axis Lb of the second end portion of the second link part 9h2 and the rotating axis La of the second end portion of the first link part 9g2 described above are disposed at positions different from each other when viewed in the horizontal direction perpendicular to the transfer direction of the door panel P. The rotating axis La and the rotating axis Lb are parallel to each other and are disposed at the same position in the vertical direction.

The second link part 9h2 described above is rotatably driven around the rotating axis Lb passing through the second end portion by receiving the power from the second rotation motor 9h1. That is, the above-described base side link rod of the second link part 9h2 can be rotatably driven around the rotating axis Lb passing through the second end portion by receiving the power from the second rotation motor 9h1. Also, when the power generated by the second rotation motor 9h1 is transmitted, the joint part 9h3 is bent driven manner, and thereby the second link part 9h2 is deformed to a bent state. When the power generated by the second rotation motor 9h1 is transmitted, the joint part 9h3 is rotationally moved around the rotating axis Lb with a radius dimension substantially the same as a length dimension of the base side link rod.

The inclination adjustment part 9 in the transfer device 1A of the present embodiment includes the sliding block 9f which is slidably connected to a main arm 6 and has a parallel link structure in which two link rods (the first link part 9g2 and the second link part 9h2) are connected to the sliding block 9f. That is, the inclination adjustment part 9 in the transfer device 1A of the present embodiment is slidably connected to the main arm 6 in the longitudinal direction of the main arm 6 and has a parallel link mechanism to adjust an inclination of the main arm 6.

Next, an operation of the transfer device 1A of the present embodiment will be described. In the following description, an operation until the door panel P formed by a press device X1 (left side in FIGS. 5 to 7) is transferred to a press device X2 (right side in FIGS. 5 to 7) will be described. A main agent of this operation is a control device (not illustrated). Also, each drawing illustrated in FIGS. 5 to 7 illustrates a moment in the process of continuously transferring the door panel P from the press device X1 to the press device X2 and does not mean that the transfer of the door panel P is temporarily stopped in the state illustrated in each drawing of FIGS. 5 to 7.

First, when a pivot motor 3 is driven, a pivot angle of a pivoting arm 5 is set so that a distal end portion is positioned slightly on the press device X1 side (left side in FIG. 5(a)) from a lowermost position as illustrated in FIG. 5(a). At the same time, the base side link rod of the first link part 9g2 is rotated by driving the first rotation motor 9g1 so that the joint part 9g3 is positioned on the press device X1 side and higher than the first rotation motor 9g1. Also, the base side link rod of the second link part 9h2 is rotated by driving the second rotation motor 9h1 so that the joint part 9h3 is positioned on the press device X1 side and lower than the second rotation motor 9h1. Thereby, a cross bar 7 is disposed at a position on a side closest to the press device X1 and lowered, and an adsorption part 8 comes into contact with the door panel P. Here, the door panel P is adsorbed and supported by the adsorption part 8 from an upper surface side. Thereby, movement of the door panel P is possible.

Further, when the pivot motor 3 continues to be driven, the pivoting arm 5 is pivoted so that the distal end portion approaches the lowermost position as illustrated in FIG. 5(b). At the same time, then the first rotation motor 9g1 continues to be driven, the base side link rod of the first link part 9g2 is rotated so that the joint part 9g3 is directed toward an uppermost position. Also, when the second rotation motor 9h1 continues to be driven, the base side link rod of the second link part 9h2 is rotated so that the joint part 9h3 is directed toward a lowermost position. Thereby, the cross bar 7 is raised from the state of FIG. 5(a). Therefore, the door panel P adsorbed by the adsorption part 8 is lifted.

Further, when the pivot motor 3 continues to be driven, as illustrated in FIG. 5(c), the pivoting arm 5 is pivoted so that the distal end portion passes the lowermost position and is positioned on the press device X2 side (right side in FIG. 5(c)). At the same time, when the first rotation motor 9g1 continues to be driven, the base side link rod of the first link part 9g2 is rotated so that the joint part 9g3 is further moved to the uppermost position. Also, when the second rotation motor 9h1 continues to be driven, the base side link rod of the second link part 9h2 is rotated so that the joint part 9h3 passes the lowermost position and is directed toward the press device X2 side (right side in FIG. 5 (c)). Thereby, the main arm 6 is pulled to the press device X2 side and is raised by being slidably supported by the sliding, block 9f, and the cross bar 7 is substantially horizontally moved to the press device X2 side. Therefore, the door panel P adsorbed by the adsorption part 8 is substantially horizontally moved toward the press device X2.

Further, when the pivot motor 3 continues to be driven, the pivoting arm 5 is rotated so that the distal end portion is positioned on the press device X2 side (right side in FIG. 6(a)) and higher than the pivot shaft part 4 in a height direction as illustrated in FIG. 6(a). At the same time, when the first rotation motor 9g1 continues to be driven, the base side link rod of the first link part 9g2 is rotated so that the joint part 9g3 is at the uppermost position. Also, when the second rotation motor 9h1 continues to be driven, the base side link rod of the second link part 9h2 is rotated so that the joint part 9h3 is further directed toward the press device X2 side. Thereby, the main arm 6 is further pulled to the press device X2 side and is raised by being slidably supported by the sliding block 9f, and the cross bar 7 is substantially horizontally moved to the press device X2 side. Therefore, the door panel P adsorbed by the adsorption part 8 is further moved substantially horizontally toward the press device X2.

Further, when the pivot motor 3 continues to be driven, the pivoting arm 5 is pivoted so that the distal end portion is at the uppermost position as illustrated in FIG. 6(b). At the same time, by rotationally driving the first rotation motor 9g1 in reverse, the base side link rod of the first link part 9g2 is rotated so that the joint part 9g3 approaches the press device X1 side (left side in FIG. 6(b)). Also, when the second rotation motor 9h1 continues to be driven, the base side link rod of the second link part 9h2 is rotated so that the joint part 9h3 is positioned further on the press device X2 side and above the second rotation motor 9h1. Thereby, the main arm 6 is in a vertical posture, and the cross bar 7 is positioned between the press device X1 and the press device X2. Therefore, the door panel P adsorbed by the adsorption part 8 is disposed between the press device X1 and the press device X2.

Further, when the pivot motor 3 continues to be driven, the pivoting arm 5 is pivoted so that the distal end portion is positioned on the press device X1 side (left side in FIG. 6(c)) and higher than the pivot shaft part 4 in the height direction as illustrated in FIG. 6(c). At the same time, when the first rotation motor 9g1 continues to be driven, the base side link rod of the first link part 9g2 is rotated so that the joint part 9g3 further approaches the lowermost position. Also, when the second rotation motor 9h1 continues to be driven, the base side link rod of the second link part 9h2 is rotated so that the joint part 9h3 is at an uppermost position. Thereby, the distal end portion of the main arm 6 is further pulled to the press device X1 side, the main arm 6 is reclined with respect to the horizontal surface by being slidably supported by the sliding block 9f, and the cross bar 7 is substantially horizontally moved to the press device X2 side. Therefore, the door panel P adsorbed by the adsorption part 8 is further moved substantially horizontally toward the press device X2.

Further, when the pivot motor 3 continues to be driven, the pivoting arm 5 is pivoted so that the distal end portion is positioned on the press device X1 side (left side in FIG. 7(a)) with respect to the lowermost position and lower than the pivot shaft part 4 in the height direction as illustrated in FIG. 7(a). At the same time, when the first rotation motor 9g1 continues to be driven, the base side link rod of the first link part 9g2 is rotated so that the joint part 9g3 is in the vicinity of the lowermost position. Also, by rotationally driving the second rotation motor 9h1 in reverse, the base side link rod of the second link part 9h2 is rotated so that the joint part 9h3 is directed toward the press device X2 side. Thereby, the main arm 6 is pushed to the press device X2 side and is further reclined by being slidably supported by the sliding block 9f, and the cross bar 7 is further moved substantially horizontally to the press device X2 side, Therefore, the door panel P adsorbed by the adsorption part 8 is further moved substantially horizontal toward the press device X2.

Further, when the pivot motor 3 continues to be driven, the pivoting arm 5 is pivoted so that the distal end portion is positioned slightly on the press device X2 side (right side in FIG. 7(b)) front the lowermost position as illustrated in FIG. 7(b). At the same time, when the first rotation motor 9g1 continues to be driven, the base side link rod of the first link part 9g2 is rotated so that the joint part 9g3 further approaches the press device X2. Also, when the second rotation motor 9h1 continues to be driven, the base side link rod of the second link part 9h2 is rotated so that the joint part 9h3 is slightly directed toward the press device X2 side. Thereby, the cross bar 7 is disposed above a placing position of the door panel P in the press device X2. Therefore, the door panel P adsorbed by the adsorption part 8 is also disposed above the placing position of the door panel P in the press device X2.

Further, when the pivot motor 3 continues to be driven, the pivoting arm 5 is pivoted so that the distal end portion is positioned further on the press device X2 side (right side in FIG. 7(c)) from the lowermost position as illustrated in FIG. 7(c). At the same time, when the first rotation motor 9g1 continues to be driven, the base side link rod of the first link part 9g2 is rotated so that the joint part 9g3 further approaches the press device X2. Also, when the second rotation motor 9h1 continues to be driven, the base side link rod of the second link part 9h2 is rotated so that the joint part 9h3 is further directed toward the press device X2 side. Thereby, the cross bar 7 is disposed at a position on a side closest to the press device X2 and louvered with respect to the position illustrated in FIG. 7(b), and the door panel P adsorbed by the adsorption part 8 is placed on the press device X2. Thereafter, the adsorption operation of the adsorption part 8 is stopped, and the door panel P is separated from the adsorption part 8, thereby completing the transfer of the door panel P from the press device X1 to the press device X2.

Further, when the cross bar 7 is returned from the press device X2 to the press device X1, an operation opposite to the above-described operation described with reference to FIGS. 5 to 7 is performed. Thereby, the cross bar 7 is continuously moved substantially horizontally from the press device X2 to the press device X1.

Also, the pivot angle of the pivoting arm 5, the position of the joint part 9g3, and the position of joint part 9h3 in the above description of the operation are merely an example in a case in which the respective members have the dimensions and shapes illustrated in FIG. 5. The dimensions and shapes of the respective members are not particularly limited. Therefore, when the dimensions and shapes of the respective members are changed, the pivot angle of the pivoting arm 5, the position of the joint part 9g3, and the position of the joint part 9h3 may also be changed according to the changed dimensions and shapes. In practice, the pivot angle of the pivoting arm 5, the position of the joint part 9g3, and the position of the joint part 9h3 are set so that the distal end position of the main arm 6 (that is, the position of the cross bar 7) is at a desired position.

In the transfer device 1A of the present embodiment described above, the inclination of the main arm 6 is adjusted using the parallel link mechanism which is made slidable in the longitudinal direction of the main arm 6 as in the transfer device 1 of the first embodiment described above. According to the transfer device 1A of the present embodiment described above, since the inclination of the main arm 6 can be adjusted by sliding the sliding block 9f, which is a connection part of the parallel link mechanism with the main arm 6, along the main arm 6, there is no need to provide an elongated mechanism in a substantially horizontal direction to adjust the inclination of the main arm 6. Therefore, since the main arm 6 can be inclined close to a horizontal posture there is no need to provide a joint in the middle of the main arm 6 or to install a motor for bending the main arm 6. Accordingly, since the need to bend the main arm 6 is eliminated, the rigidity of the main arm 6 can be enhanced, and furthermore, a transfer speed and stability of the door panel P can be enhanced, and power for driving the main arm 6 can be reduced.

Also, in the transfer device 1A of the present embodiment, the parallel link mechanism includes the sliding block 9f which is slidably attached on the main arm 6, the first link part 9g2 having the joint part 9g3, of which one end portion is rotatably connected to the sliding block 9f and the other end portion is rotatably driven around the rotating axis La, and the second link part 9h2 having the joint part 9h3, of which one end portion is rotatably connected to the sliding block 9f and the other end portion is rotatably driven around the rotating axis Lb. Also in the transfer device 1A of the present embodiment, the structure of the parallel link mechanism can be simplified, and weight reduction of the movable parts of the transfer device 1A can be achieved Also, in the transfer device 1A of the present embodiment, the inclination adjustment part 9 includes the first rotation motor 9g1 which rotationally drives the other end portion of the first link part 9g2 around the rotating axis La, and the second rotation motor 9h1 which rotationally drives the other end portion of the second link part 9h2 around the rotating axis Lb. According to the transfer device 1A of the present embodiment described above, a posture of the main arm 6 can be adjusted with a simple structure. Further, in the transfer device 1A of the present embodiment, the first rotation motor 9g1 and the second rotation motor 9h1 are fixed to the frame 2. Therefore, at the time of the operation of the transfer device 1A, since the first rotation motor 9g1 and the second rotation motor 9h1 are not moved, power for driving the transfer device 1A can be reduced.

The preferred embodiments of the present invention have been described above with reference to the accompanying drawings, but the present invention is not limited to the above-described embodiments. Shapes, combinations, or the like of the respective constituent members illustrated in the above-described embodiments are merely examples, and various changes can be made on the basis of design requirements or the like without departing from the spirit of the present invention.

For example, in the first, embodiment described above, a configuration in which the first linear motion mechanism 9b linearly moves the upper end portion of the swing arm 9c using the first ball screw 9b3 and the second linear motion mechanism 9d linearly moves the upper end portion of the support arm 9e using the second ball screw 9d3 has been described. However, the present invention is not limited thereto, and a belt drive mechanism linear motor mechanism may be installed instead of at least one of the first ball sere 9b3 and the second ball screw 9d3.

Also, in the first embodiment described above, a configuration in which the inclination adjustment part 9 includes the swing arm 9c and the support arm 9e as a link rod has been described. However, the present invention of limited thereto, and a configuration in which the inclination adjustment part 9 includes three or more link rods can also be employed.

For example, in the second embodiment described above, the first rotation motor 9g1 is fixed to one of the beam parts 2b of the frame 2, and the second rotation motor 9h1 is fixed to the other of the beam parts 2b of the frame 2. That is, in the second embodiment described above, a configuration in which the first rotation motor 9g1 and the second rotation motor 9h1 are disposed on both sides of the main arm 6 to sandwich the main arm 6 is employed. However, the present invention is not limited thereto, and a configuration in which the first rotation motor 9g1 and the second rotation motor 9h1 are disposed on one side of the main arm 6 can also be employed.

Also, in the second embodiment described above, a configuration in which the inclination adjustment part 9 includes two link parts (the first link part 9g2 and the second link part 9h2) has been described. However, the present invention is not limited thereto, and a configuration including three or more link parts can also be employed.

Also, in the second embodiment described above, a configuration in which one joint part is provided at each of the first link part 9g2 and the second link part 9h2 has been described. However, the present invention is not limited thereto, and a configuration in which first link part 9g2 and the second link part 9h2 include a plurality of joint part be employed. That is, each of the first link part 9g2 and the second link part 9h2 may have at least one joint part.

Also, in the embodiments described above, a configuration of supporting the door panel P by adsorption has been described. However, the present invention is not limited thereto, and a configuration in which the door panel P is supported by other methods such as grasping and supporting from below can also be employed.

Also, in the embodiments described above, a configuration in which an object to be transferred is the door panel P has been described. However, an object to be conveyed of the present invention is not limited to the door panel P as a matter of course, and an object to be transferred other than the door panel ay be appropriately selected.

Further, in the embodiments described above, although the transfer devices 1 and 1A are used to transfer the object to be transferred from one press device X1 to the other press device X2, it may be widely used to transfer the object to be transferred from a first device to a second device, or from a first location to a second location.

The invention claimed is:

1. A transfer device which transfers an object to be transferred, comprising:
   a pivoting arm supported by a frame and configured to be rotatably driven around a pivot axis;
   a main arm which is rotatably connected to the pivoting arm at a connection position and having a distal end portion which is connected with a support part which supports the object to be transferred; and
   an inclination adjustment part which is connected to the main arm at a location between the connection position of the main arm with the pivoting arm and the distal end portion of the main arm so as to be slidable in a longitudinal direction of the main arm, and which includes a parallel link mechanism to adjust an inclination of the main arm.

2. The transfer device according to claim 1, wherein the parallel link mechanism includes:

a surrounding member which is attached on the main arm between the connection position of the main arm with the pivoting arm and the distal end portion of the main arm so as to be slidable along the main arm in the longitudinal direction of the main arm;

a first link rod of which one end portion is rotatably connected to the surrounding member and the other end portion is lowered as it is moved toward a downstream side in a transfer direction of the object to be transferred; and a second link rod of which one end portion is rotatably connected to the surrounding member and the other end portion is raised as it is moved toward the downstream side in the transfer direction of the object to be transferred.

3. The transfer device according to claim 2, wherein the inclination adjustment part includes:

a first linear motion guide which guides the other end portion of the first link rod to be directed downward toward the downstream side in the transfer direction of the object to be transferred;

a first linear motion motor which generates power to move the other end portion of the first link rod;

a second linear motion guide which guides the other end portion of the second link rod to be directed upward toward the downstream side in the transfer direction of the object to be transferred; and a second linear motion motor which generates power to move the other end portion of the second link rod.

4. The transfer device according to claim 3, wherein the first linear motion guide, the second linear motion guide, the first linear motion motor, and the second linear motion motor are fixed to the frame.

5. The transfer device according to claim 1, wherein the parallel link mechanism includes:

a surrounding member which is attached on the main arm between the connection position of the main arm with the pivoting arm and the distal end portion of the main arm so as to be slidable along the main arm in the longitudinal direction of the main arm;

a first link part having at least one joint part, of which one end portion is rotatably connected to the surrounding member and the other end portion is rotatably driven around a first rotating axis; and a second link part having at least one joint part, of which one end portion is rotatably connected to the surrounding member and the other end portion is rotatably driven around a second rotating axis.

6. The transfer device according to claim 5, wherein the inclination adjustment part includes:

a first rotation motor which rotationally drives the other end portion of the first link part around the first rotating axis; and a second rotation motor which rotationally drives the other end portion of the second link part around the second rotating axis.

7. The transfer device according to claim 6, wherein the first rotation motor and the second rotation motor are fixed to the frame.

* * * * *